United States Patent
Sindt

(10) Patent No.: US 6,621,042 B2
(45) Date of Patent: Sep. 16, 2003

(54) APPARATUS AND METHOD FOR IMPROVING THE RIDE QUALITY OF LIFT TRUCKS

(76) Inventor: Gale L. Sindt, 403 Orange St., Tipton, IA (US) 52772

( * ) Notice: Subject to any disclaimer, the term of this patent is extended or adjusted under 35 U.S.C. 154(b) by 147 days.

(21) Appl. No.: 09/947,014

(22) Filed: Sep. 5, 2001

(65) Prior Publication Data

US 2002/0043143 A1 Apr. 18, 2002

Related U.S. Application Data

(62) Division of application No. 09/329,525, filed on Jun. 10, 1999, now Pat. No. 6,308,762.

(51) Int. Cl.[7] .............................................. B23K 26/36
(52) U.S. Cl. .................................................. 219/121.69
(58) Field of Search ....................... 219/121.69, 121.67, 219/121.68, 121.73, 121.74, 121.75; 30/136, 136.5; 29/22; 157/11, 13; 83/951, 928; 451/920

(56) References Cited

U.S. PATENT DOCUMENTS

| | | | |
|---|---|---|---|
| 2,675,075 A | | 4/1954 | Constantakis |
| 2,921,627 A | | 1/1960 | Constantakis |
| 3,763,914 A | | 10/1973 | Vance |
| 4,071,071 A | | 1/1978 | Graves et al. |
| 4,137,101 A | * | 1/1979 | Stock .............................. 29/22 |
| 4,147,196 A | | 4/1979 | Jarry |
| 4,417,492 A | | 11/1983 | Winecoff |
| 4,476,761 A | | 10/1984 | Bird |
| 5,443,537 A | * | 8/1995 | Haskins ........................ 33/193 |
| 5,461,783 A | * | 10/1995 | Henderson .................... 30/124 |
| 6,308,762 B1 | * | 10/2001 | Sindt ........................... 157/13 |

* cited by examiner

Primary Examiner—Tom Dunn
Assistant Examiner—Jonathan Johnson
(74) Attorney, Agent, or Firm—Simmons, Perrine, Albright & Ellwood, P.L.C.

(57) ABSTRACT

A method and apparatus for reconditioning tires while on lift trucks where a cutting tool is mounted to the lift truck and brought in contact with the tire and the tire is rotated, thereby removing material to return the tire to a more circular shape.

20 Claims, 3 Drawing Sheets

APPARATUS AND METHOD FOR IMPROVING THE RIDE QUALITY OF LIFT TRUCKS

This application is a divisional application of prior application Ser. No. 09/329,525 filed on Jun. 10, 1999 now U.S. Pat. No. 6,308,762.

FIELD OF THE INVENTION

The present invention generally relates to material handling and more particularly relates to lift trucks, and even more particularly relates to an apparatus and method for improving the ride quality of lift trucks.

BACKGROUND OF THE INVENTION

In the past, lift trucks have been used extensively for material handling, including indoors. Many of these lift trucks use solid rubber tires, often referred to as cushion tires. These cushion tires come in several varieties, including those designed not to leave skid marks on the floor. While these tires have many advantages, they also have several drawbacks. These tires are relatively expensive and they often become worn or damaged. Uneven wear of the tires can result in vibration during operation of the lift truck. Moreover, excessive vibration can be dangerous. Since these cushion tires typically serve as the suspension for the lift truck, any vibration caused by the tires may be transmitted to the load or to the operator. Lower back problems are not uncommon among lift truck drivers who operate with worn tires. Often, operators compensate for the worn tires by operating the lift trucks at lower speed, thereby reducing productivity.

Consequently, there exists a need for improvement in lift truck tires and the quality of ride they provide.

SUMMARY OF THE INVENTION

It is an object of the present invention to provide enhanced ride quality for lift trucks.

It is a feature of the present invention to recondition the worn and damaged tires.

It is an advantage of the present invention to reduce the frequency of tire replacement and its associated cost.

It is another advantage of the present invention to decrease the lift truck downtime required for uneven tire wear remediation.

It is yet another advantage of the present invention to enhance the environment by reducing the frequency of discarding tires.

It is another feature of the present invention to use a lift truck mounted tire reconditioning device.

It is another advantage of the present invention to provide for tire wear remediation without requiring removal of the tire.

The present invention is an apparatus and method for improving the quality of ride for lift trucks, which is designed to satisfy the aforementioned needs, provide the previously stated objects, include the above-listed features and achieve the already articulated advantages. The present invention is carried out in a "tire removal-less manner" in a sense vibration caused by excessive tire wear can often be greatly reduced without a requirement to remove and replace the tire.

Accordingly, the present invention is a system and method for reconditioning lift truck tires, using a carriage-mounted device for removing portions of the tire.

BRIEF DESCRIPTION OF THE DRAWINGS

The invention may be more fully understood by reading the following description of the preferred embodiments of the invention, in conjunction with the appended drawings wherein.

DETAILED DESCRIPTION

Figure 1:
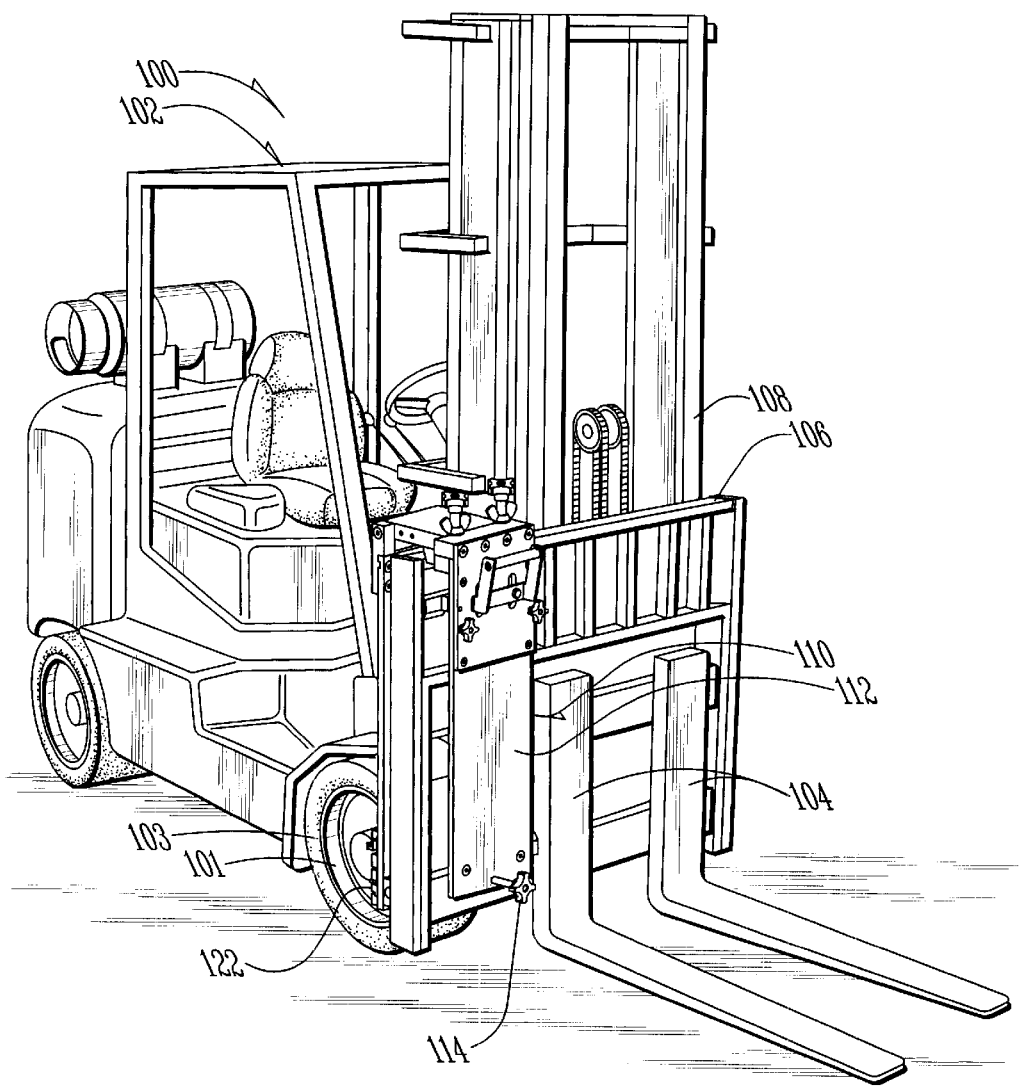
FIG. 1 is a simplified diagram of the apparatus of the present invention mounted on a carriage of a lift truck.

Now referring to the drawings, wherein like numerals refer to like matter throughout, and more particularly to FIG. 1, there is shown a system of the present invention, generally designated 100, which includes a lift truck 102, having a front wheel 101, front tire 103. The lift truck 102 also has a fork 104 coupled to a carriage 106 coupled to a mast 108, in a well-known manner. Coupled to carriage 106 is the apparatus of the present invention, generally designated 110, having a front side 112 and a material removal adjustment screw 114. Also shown is material removing apparatus 122 disposed in a position near front tire 103.

Figure 2:
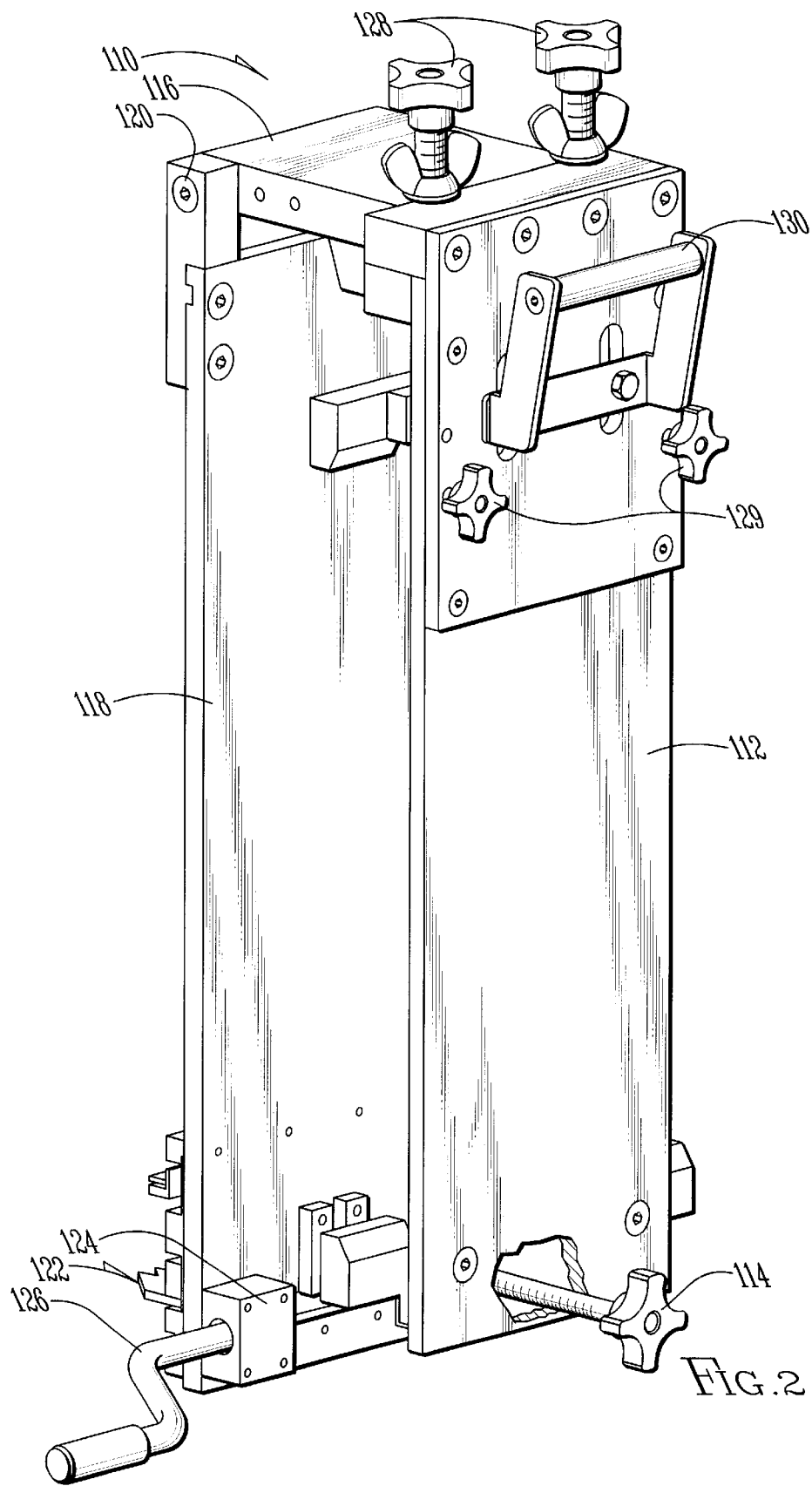
FIG. 2 is a perspective view of the apparatus of the present invention.

Now referring to FIG. 2, there is shown a perspective view of the apparatus of the present invention 110. In general, the apparatus 110 is shown as a three-sided assembly of rigid panels, including front side 112, back side 118 and top side 116. However, it should be understood that any mechanism for coupling material removing apparatus 122 to a lift truck 102 could be substituted. The side panel may be of aluminum or any material which is suitable for providing the necessary structural support for the material removing apparatus 122. The apparatus 110 fits over a portion of the lift truck carriage 106 of FIG. 1. The apparatus is coupled to the carriage by several attachment screws 128, which may be threaded to accommodate various carriage designs. Top side 116 and back side 118 are coupled through a hinge 120, for allowing pivotal motion of the back side 118. Top side 116 is rigidly coupled to front side 112, which is detachably rigidly coupled through attachment screws 128 to the carriage 106. The material removing apparatus 129 can be moved to a desired position with respect to front tire 103, by material removal adjustment screw 114. Material removing apparatus 122 may be a set of carbide tips, a single knife edge, a laser or any other devices which are capable of removing rubber or other material from the surface of a rotating lift truck tire. Material removing apparatus 122 may be fixed to the back side 118, or it may be adjustable with lateral adjustment mechanism 124. Other adjustments, including vertical and angular adjustments, could be provided as well. Lateral adjustment mechanism 124 may be manipulated with manual crank 126. Alignment of the material removing apparatus 122 with respect to the tire 103 may be further improved by alignment screws 129. Since the apparatus 110 can be used on various lift trucks, it may include a handle 130 for easy installation and removal. Manual crank 126 and material removal adjustment screw 114 may be substituted with various other mechanical, electro-mechanical and computer devices for controlling the removal of material from the tire. Well-known techniques of lathe operation and control techniques can be readily implemented, depending upon the precise design requirements for any particular apparatus.

Figure 3:
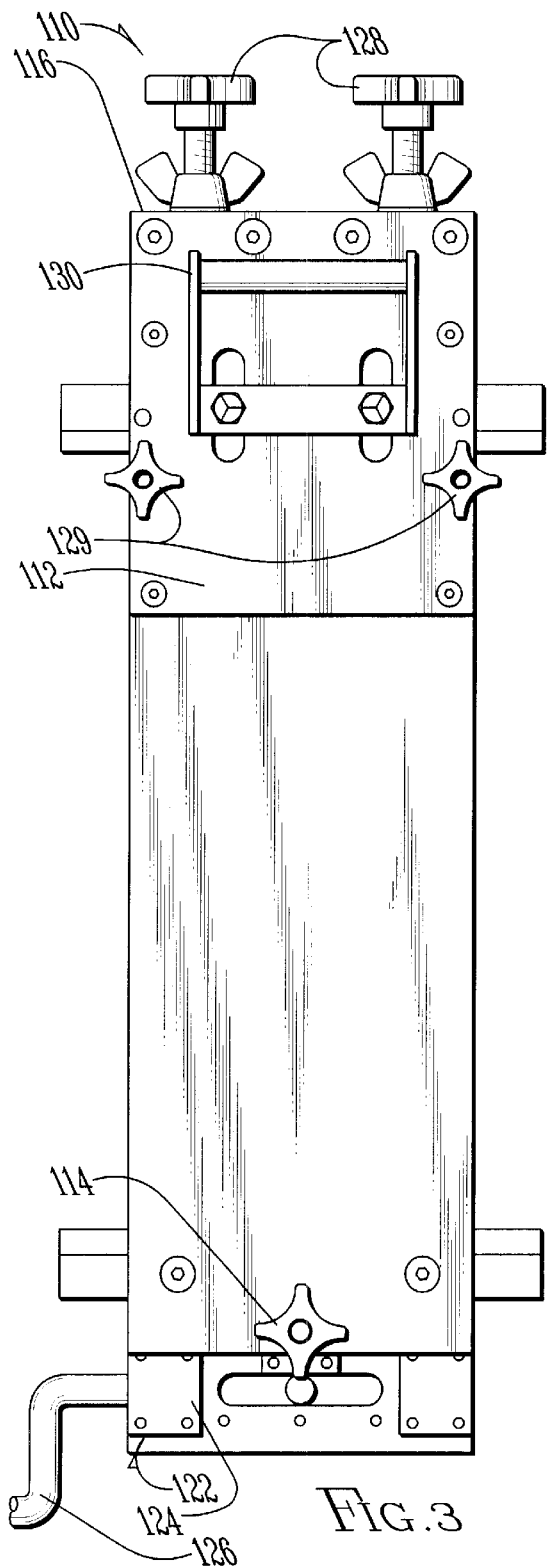
FIG. 3 is a front view of the apparatus of FIG. 2.

Now referring to FIG. 3, there is shown a front view of the apparatus 110 of the present invention which shows the various attachment screws 128 used to couple the front side firmly with the carriage 106.

Figure 4:
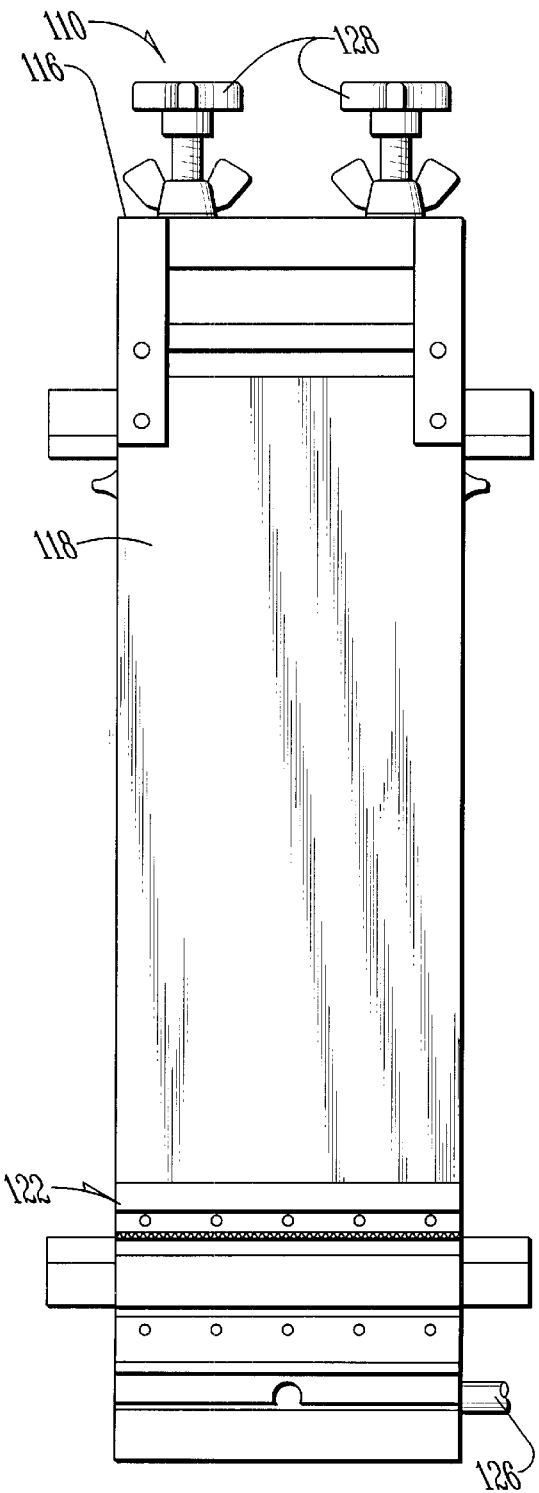
FIG. 4 is a back side view of an apparatus of FIG. 2.

Now referring to FIG. 4, there is shown a back side view, which more clearly shows the placement of material removing apparatus 122, shown having a plurality of sharp tips for cutting surfaces.

In operation, the present invention accomplishes the goal of improving the ride of lift trucks by providing a readily deployable method and apparatus to recondition the surface of a lift truck tire. The method of the present invention is as follows:

First, provide some adjustable material removing apparatus;

Second, cause the lift truck tire to spin,

Third, engage the material removal apparatus so as to remove material from the spinning tire in a controlled adjustable fashion.

In a preferred method, a plurality of carbon tips is caused to engage the rotating tire. The tips are adjusted so that they cause additional material to be removed from the tire surface.

While throughout this description, the invention has been characterized as a means for improving the ride of a lift truck, it is contemplated that other uses and other vehicle types could be serviced as well. Additionally, while the apparatus may be best used when attached to a lift truck, it can be used as well as a separate apparatus which is detached from the lift truck, such as, but not limited to, an assembly up to which a lift truck could drive, or an assembly which is placed next to the lift truck.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. A method of reconditioning a tire on a lift truck comprising the steps of:

providing a material removing apparatus in proximity to said tire;

positioning said material removing apparatus so as to cause material removal from said tire.

2. A method of claim 1 further comprising the step of using a lift on said lift truck to raise the tire above a surface upon which the lift truck is positioned.

3. A method of claim 1 wherein said providing a material removing apparatus includes providing a laser.

4. A method of claim 1 wherein said step of positioning said material removing apparatus is done with a computer processor.

5. A method of claim 1 wherein said step of positioning said material removing apparatus is done with a manual adjustment.

6. A method of claim 2 wherein said step of rotating the tire is accomplished through a drive train on said lift truck.

7. A method of claim 1 wherein said step of rotating the tire is accomplished through a drive mechanism detached from said lift truck.

8. A method of claim 1 wherein said step of rotating is accomplished in part with a detached device for elevating said tire.

9. A method of claim 1 further comprising a step of adjusting said material removing apparatus so as to remove additional matter from said tire.

10. A method of using a lift truck:

providing a lift truck with a tire thereon;

driving said lift truck at least until said tire exhibits some uneven wear;

providing a tire cutting device;

positioning said tire cutting device adjacent to said tire;

rotating said tire, while said tire remains attached to a wheel and while said wheel is connected to said lift truck;

causing matter from said tire to be removed as said tire cutting device contacts said tire;

removing said tire cutting device; and, driving said lift truck on said tire after said matter has been removed.

11. The method of claim 10 wherein said step of rotating said tire comprises using an engine of said lift truck to rotate said tire.

12. The method of claim 11 further comprising the step of lifting said tire from contact a surface upon which said lift truck rest by using a lift on said lift truck.

13. The method of claim 12 where the step of positioning a tire cutting device comprises attaching said tire cutting device to said lift truck.

14. The method of claim 13 wherein said step of positioning said tire cutting device further comprises making adjustments which vary an amount of contact between said tire and said tire cutting device.

15. The method of claim 14 wherein said step of providing a tire cutting device comprises providing a tire cutting device having a plurality of carbine tips thereon.

16. The method of claim 15 wherein said amount of contact varies with respect to a penetration amount into a wear surface of said tire.

17. The method of claim 16 wherein said step of attaching said tire cutting device includes the step of clamping said tire cutting device to said lift of said lift truck.

18. A method of removing matter from a roadbed surface engaging portion of a tire on a wheel on a vehicle;

providing an apparatus for removing matter from said roadbed surface engaging portion of said tire;

engaging said apparatus with said roadbed surface engaging portion; and, rotating said wheel while on said vehicle so that said tire rotates and said roadbed portion of said tire contacts said apparatus, thereby removing matter from said tire.

19. The method of claim 18 wherein said vehicle is a lift truck.

20. The method of claim 18 wherein said step of engaging said apparatus comprises causing a plurality of carbide tips to contact said road surface engaging portion.

* * * * *